2,604,132

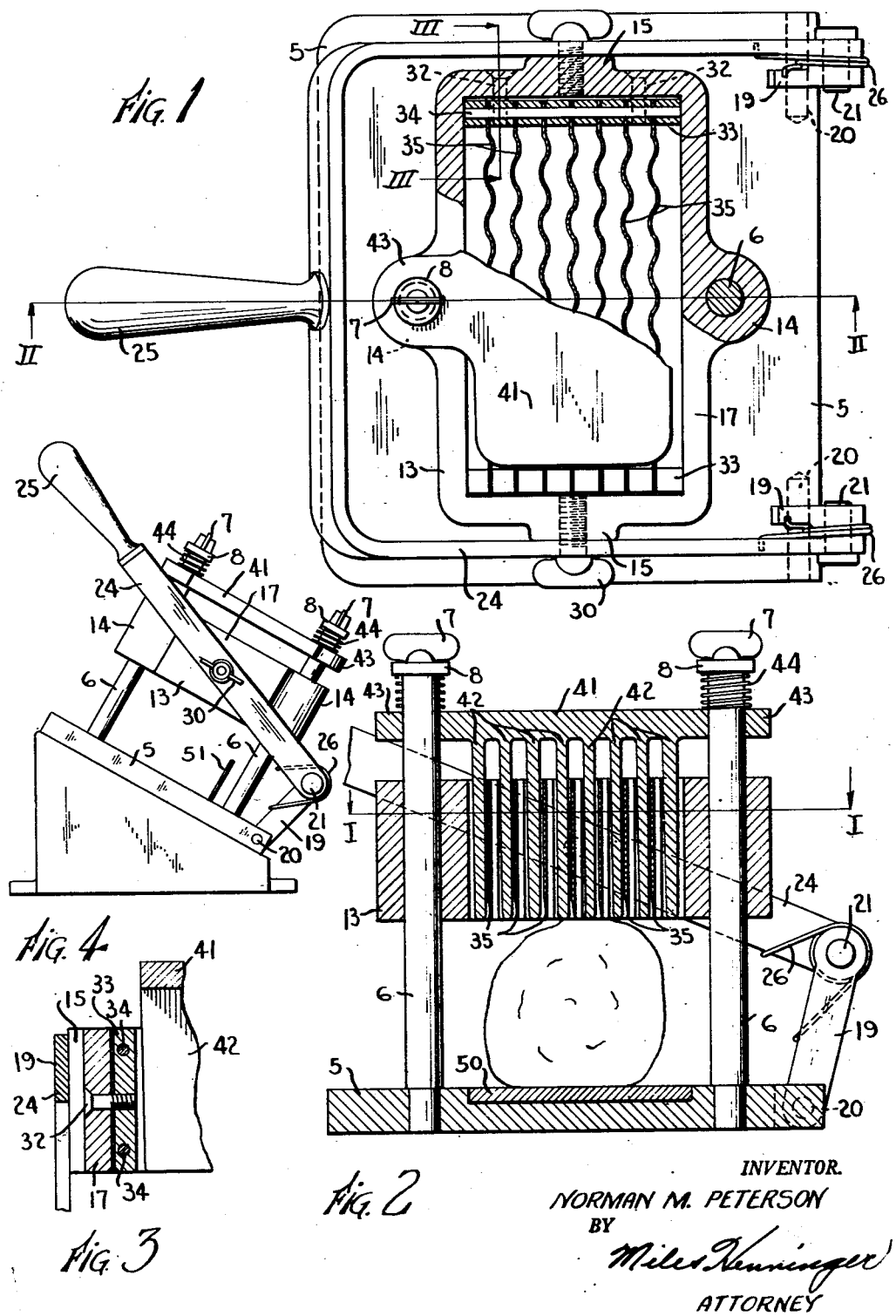
July 22, 1952   N. M. PETERSON   2,604,132
FOOD-SLICING MACHINE
Filed April 22, 1949
INVENTOR.
NORMAN M. PETERSON
BY
Miles Kenninger
ATTORNEY Patented July 22, 1952

UNITED STATES PATENT OFFICE 2,604,132

FOOD-SLICING MACHINE

Norman M. Peterson, Racine, Wis., assignor to Norco Manufacturing Company, Racine, Wis., a copartnership Application April 22, 1949, Serial No. 89,051

6 Claims. (Cl. 146—152)

This invention relates to improvements in machines for cutting foodstuffs and particularly to machines for slicing or dicing fruits, vegetables and the like.

It is one object of the present invention to provide a machine for cutting foods into slices of substantially predetermined thickness or strips of predetermined thickness and width or for cutting foods into generally cubical portions of substantially given dimensions, the size of the food article cut being unlimited so far as ease of operation of the machine is concerned.

Another object of the invention is to provide a food-slicing or dicing machine in which a plurality of spaced knives are braced or held to permit only a limited but desirable degree of lateral flexure during the cutting operation and without interference with the cutting operation, by the same means as eject the sliced or diced food from between the knives.

Another object of the invention is to provide a food-cutting machine with a plurality of knives in spaced relation for simultaneously cutting foods into a plurality of portions, and to provide means co-acting automatically with such knives for holding the food during the cutting operation and for removing the cut food from between the several knives after the cutting operation.

A further object of the invention is to provide a food-slicing or dicing device which is quickly and easily disassembled for cleaning and re-assembled without tools and by anyone capable of operating the machine.

And a further object of the invention is to provide a food-slicing or dicing machine of relatively small size and low weight, with a minimum number of parts of rugged and simple construction and with parts, other than the knives, requiring little maintenance or infrequent replacement, and which will be lower in cost and more effectively and rapidly operable than known machines.

Objects and advantages other than those above set forth will be apparent from the following description when read in connection with the accompanying drawing in which:

Fig. 1 is a view partially in section on a horizontal plane through line I—I of Fig. 2 and partially in top plan;

Fig. 2 is a sectional view on a vertical plane through line II—II of Fig. 1;

Fig. 3 is a fragmentary transverse section on a plane through line III—III of Fig. 1; and Fig. 4 is a reduced size somewhat diagrammatic, side elevation of a modified form of the present invention.

Generally, the present invention includes a supporting structure and a movable structure, the supporting structure comprising a base with guides extending from the base and links pivoted at one end on the base. The movable structure includes a handle pivotally mounted on the other end of the links and pivotally supporting a cutter head reciprocable on the guides. The cutter head includes a frame and means for the tensioned mounting therein of a plurality of knives in spaced parallel relation. An ejector head, in one sense, also forms a part of the movable structure in that such ejector head is reciprocable with the cutter head in one direction but is movable separately in the other direction, under the action of gravity and springs. The ejector head serves to hold an object on the base before entry of the knives thereinto, during the cutting operation and upon withdrawal of the knives. The ejector head also serves as a spacer for the knives to brace and hold the knives in spaced relation with a limited degree of flexure thus facilitating both cutting and withdrawal action of the knives, and materially affecting the size of objects which may be cut by the device.

Referring to the drawing in which like reference numerals designate like parts, 5 designates a base which is preferably of metal resistant to corrosion and the juices encountered in cutting or dicing foods. The base is finished sufficiently to provide a readily cleanable surface of attractive appearance and is of sufficient size and weight to give stability to the device when the device is not fixed to a rigid support. It will be noted that the base, in the horizontal dimensions, is only slightly larger than the remaining structural elements supported thereby. Similar posts 6 preferably of circular cross-section, are fixed in the base and extend at right angles therefrom in spaced relation to serve as guides for movement of other portions of the device. The spacing of the guides is determined only by the size of food objects to be cut and which may be any practical size. The free ends of the guides are axially drilled and threaded to receive thumb screws 7 with an integral flange 8.

The movable structure of the device includes a frame 13 which is integral and rectangular except for the lugs 14 extending from two of the sides thereof and formed with circular apertures therethrough, and bosses 15 extending from the ends thereof. The apertures in lugs 14 are slightly larger in diameter than the guides 6 for free sliding thereon and the bosses 15 are apertured for severally receiving pivots as will be described. The mounting for frame 13 includes links 19 pivotally connected at one end by pivots 20 with the base and connected at the other ends thereof by pivots 21 with an operating handle including a yoke 24 and a handle portion 25. Helical torsion springs 26 are mounted on pivots 21 between the links 19 and the ends of the handle yoke 24 and the ends of such springs engage the links and the yoke in such manner that the springs tend to retain the handle 24, 25 in raised position. The frame 13 and the handle 24, 25 are pivotally joined by thumb screws 30 threaded into the handle but form free pivots in the apertures in the frame bosses 15.

The frame 17 has a number of apertures through the ends thereof to receive screws 32 by which a cutter head is fixed in the frame. Such cutter head comprises blocks 33 tightly held together by means such as rivets or screws 34 to clamp the ends of knives 35 severally between adjacent blocks. The knives 35 may be either corrugated or plane-surfaced substantially rectangular strips of relatively thin steel with a cutting edge along one side thereof and extend between similar clamping block structures adjustably mounted in the ends of the frame by screws 32. It will be understood that the clamping block structures are spaced from the frame ends only sufficiently to permit placing the knives under some tension. It will also be noted that the knives are uniformly spaced from one another and that a sufficient number of knives is provided for substantially filling the space within the frame and to provide spaced knife edges over a horizontal area greater than the maximum size of the food article to be sliced or cubed. It will be understood that corrugated knives provide greater surface areas for given volumes of slices or strips for faster cooking. But such knives cannot be tensioned as much as plane knives and are accordingly more likely to flex and jam.

The movable portion of the structure also includes an ejector head comprising back plate 41 on which are fixed or formed plates 42 in spaced parallel relation for several movement thereof in the spaces between the knives. The plates 42 are spaced from the knives only $\frac{1}{16}$ to $\frac{1}{32}$ inch to permit only a limited flexing of the knives and to serve as braces for the knives if the knives should tend to flex beyond the limited degree. The back plate 41 is provided with ears 43 apertured to a size considerably larger than the guide posts 6 so that the ejector head does not slide on the guides but is positioned only by the food article and the knives. Helical compression springs 44 are severally mounted on the guides 6 between the ejector back plate 41 and the thumb screws 7 and co-act with gravity in tending to keep the ejector head in contact with the food article, the ejector head being shown in such contact in Fig. 2, at the beginning of a cutting operation. The springs 44 and other parts mounted on the guides are readily removed merely by removing thumb screws 7 and 30.

A board 50 of plywood or other suitable material is preferably inserted in the base plate 5 to minimize blunting of the knife edges during cutting action. It will be understood that the springs 26 are sufficiently heavier than springs 44 to keep the cutter head and the ejector head in raised position against the action of gravity when a whole food article is to be placed on the board 50 or when a sliced food article is to be removed from the device.

The structure shown in Fig. 4 differs from that previously described only by having the base 5 formed with the food-receiving surface at an angle so that the food articles may be observed by the operator when placed on or removed from the machine. A back plate 51 is then fixed on the base to hold the articles in the cutting position. Operation of the device is considerably facilitated by the improved observation possible with the angular base as compared to the horizontal base.

It will be seen that the present device provides a cutter head and an ejector head which are automatically held in raised position while a food article is being placed beneath the cutter head. Pressure is then exerted on the handle and the knife edges are brought into contact with the food article, the ejector head following the cutter head under the action of gravity and the springs 44 into contact with the food article. The knives are braced and spaced by the ejector head plates 42 while cutting action is beginning which is when the knives are most likely to flex laterally and to resist the cutting action. As the knives are pressed through a food article, the edges of the ejector plates 42 rest on the article and tend to keep the article from drifting out of position as the knives pass therethrough. When the cutting action is finished, the handle is lifted to raise the cutter head until the knives are retracted from the food while the food is held on the base by the weight of the ejector head and the action of the springs thereon. As soon as the knives are retracted and both the cutter and ejector head lifted to the uppermost position, the handle is released and springs 26 automatically hold both the cutter and the ejector heads in the raised position.

It has been found that co-action of the cutting and ejecting head makes it possible to provide cutter heads with no limitation on the size of the food article to be cut. Flexure of the knives is limited to a given range which has been found critical particularly when the food article is larger than a given size. The food article is held in place by the ejector head before and during the cutting operation and while the knives are being withdrawn therefrom. Operation of the machine and handling of the cut foods is thus greatly facilitated as compared to machines now in use. The machine provides a minimum number of sub-assemblies which are readily disassembled for ease in cleaning merely by removing a small number of thumb screws. Other advantages of the construction are apparent and need not be specifically set forth.

Although but two embodiments of the present invention have been illustrated and described, it will be apparent to those skilled in the art that various changes and modifications may be made therein without departing from the spirit of the invention or the scope of the appended claims.

I claim:

1. A food-slicing and dicing machine, a base plate, guide posts extending from the base in spaced relation, links pivotally mounted at one end on the base, a handle pivoted on the other end of the links, springs acting between the links of the handle for urging one end of the handle upwardly, a cutter head mounted on the guides for sliding movement thereon and pivotally mounted on the handle, an ejector head mounted on the guides for sliding movement thereon and engageable by the cutter head upon lifting thereof, and springs acting on the ejector head for urging the same downwardly independently of the movement of the cutter head, the ejector head being lifted by the cutter head upon upward movement thereof.

2. In a food-slicing and dicing machine, a base plate, guide posts extending from the base in spaced parallel relationship, a cutter head mounted on the guides for reciprocation thereon, the cutter head including an integral rectangular frame with clamping blocks mounted in the frame for adjustment in one direction thereon and a plurality of knives held in spaced parallel relation by the blocks, adjustment of the blocks tensioning the knives, an ejector head mounted on the guides for reciprocation thereon and co-acting with the cutter head for the ejection of food therefrom, and a handle pivoted on the base and the cutter head for actuating the cutter head in both directions of reciprocation and for actuating the ejector head in one direction of reciprocation.

3. In a food-slicing and dicing machine, a base plate, guide posts extending from the base in spaced parallel relationship, a cutter head mounted on the guides for reciprocation thereon, the cutter head including an integral substantially rectangular frame, a plurality of knives and sets of clamping blocks holding the knives in spaced parallel relation under tension in the frame, the sets of clamping blocks being pressed together to hold the ends of the knives severally between adjacent blocks and the sets of blocks being mounted in the frame for adjustment longitudinally thereof, an ejector head mounted on the guides for reciprocation thereon and coacting with the cutter head for the ejection of food therefrom, and a handle pivoted on the base and the cutter head in both directions of reciprocation and for actuating the ejector head in one direction of reciprocation.

4. In a food-cutting machine, a base having an upper surface at an angle to horizontal, a plate extending at an angle from the base to hold thereon food to be cut, links pivotally mounted at one end of the base and on opposite sides of the base, guides extending upwardly from the base in spaced parallel relation and at right angles thereto, screws on the ends of the guides, a cutter head including a plurality of laterally flexible knives therein in spaced parallel relation, an ejector head, means for mounting the ejector head on the guides above the cutter head for free sliding on the guides, the ejector head including blades extending beyond both the backs and the cutting edges of the knives for holding the knives against flexure and for engaging food to be cut both prior to cutting and after withdrawal of the knives therefrom, the cutter head and the ejector head being mounted on and restrained in their movements by the guides and limited in their movements by the screws, and a handle pivoted on the base and to the cutter head for lifting the cutter head and the ejector head and for lowering the cutter head, the ejector head moving downwardly independently of the lowering of the cutter head.

5. In a food-cutting machine, a base, guide posts extending from the base in spaced parallel relation, a cutter head mounted on the guides for reciprocation thereon, an ejector head mounted on the guides for reciprocation thereon, the ejector head being movable with and relative to the cutter head and co-acting with the cutter head for the ejection of cut food therefrom, and a handle pivoted on the base and to the cutter head for actuating the cutter head in both directions of reciprocation, the cutter head being beneath the ejector head for engaging and lifting the ejector head upon raising of the cutter head for a predetermined distance from the cutting position and portions of the ejector head extending through the cutter head toward the food to be cut when the cutter head is in raised position.

6. In a food-slicing and dicing machine, a base plate, guide posts extending from the base in spaced parallel relation, a plurality of knives in a cutter head mounted on the guides for reciprocation thereon, an ejector head mounted on the guides for reciprocation thereon, the ejector head being movable with and relative to the cutter head and co-acting with the cutter head for the ejection of cut food therefrom, the ejector head including a back plate located above the cutter head, blades carried by the back plate acting between the knives for holding the knives against lateral flexure, the ejector head blades being of a width to extend beyond the cutting edges of the knives when the cutter head is in raised position for engaging the food to be cut before entry of the knives thereinto, and a handle pivoted on the base and the cutter head for actuating the cutter head in both directions of reciprocation, the cutter head engaging the ejector head for lifting the ejector head, the ejector head extending beyond the cutter head toward the food to be cut both prior to and after withdrawal of the cutter head from cutting position.

NORMAN M. PETERSON.

REFERENCES CITED

The following references are of record in the file of this patent:

UNITED STATES PATENTS

| Number | Name | Date |
| --- | --- | --- |
| 484,155 | Jones | Oct. 11, 1892 |
| 1,040,582 | Royer | Oct. 8, 1912 |
| 1,610,236 | Ayars | Dec. 14, 1926 |
| 2,303,595 | Young | Dec. 1, 1942 |
| 2,322,243 | Larson et al. | June 22, 1943 |

FOREIGN PATENTS

| Number | Country | Date |
| --- | --- | --- |
| 662,641 | France | Mar. 25, 1929 |
| 717,856 | France | Oct. 26, 1931 |
| 41,903 | France | Jan. 31, 1933 |
| | (Second addition to No. 711,983) | |
| 755,599 | France | Sept. 11, 1933 |